Aug. 3, 1926.
E. L. NIXON
1,594,548
ART OF PROPAGATING TREES
Filed May 27, 1924
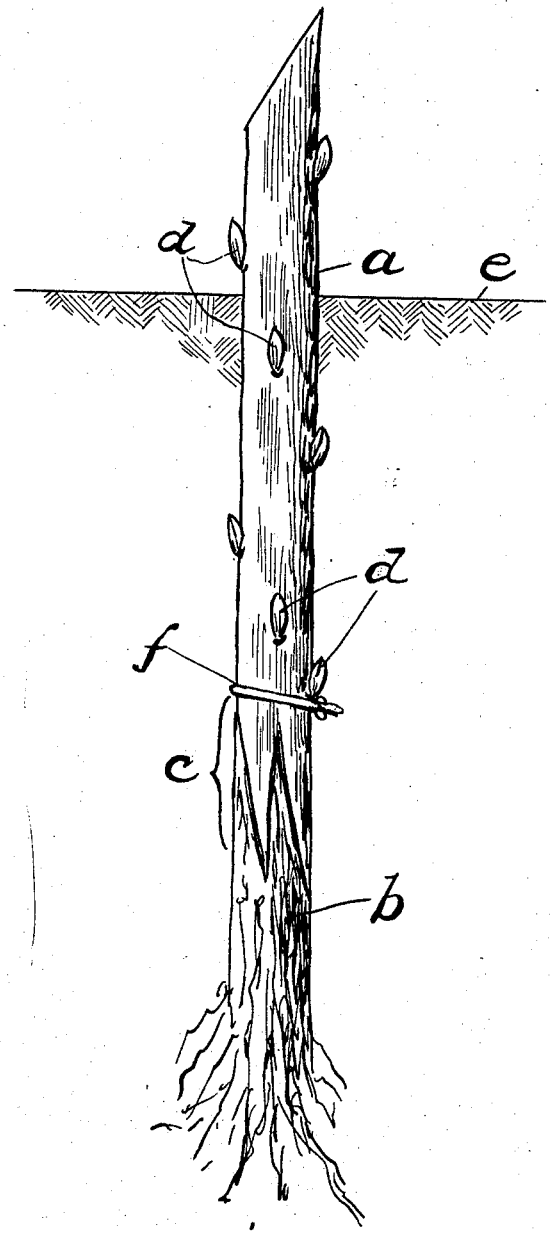
WITNESS:
INVENTOR
Ernest L. Nixon
BY
ATTORNEYS.

Patented Aug. 3, 1926.

1,594,548

UNITED STATES PATENT OFFICE.

ERNEST L. NIXON, OF STATE COLLEGE, PENNSYLVANIA.

ART OF PROPAGATING TREES.

Application filed May 27, 1924. Serial No. 716,121.

In fruit tree nurseries, it is customary to either cut a piece from a twig or shoot of a grown or growing tree and graft it on a root and then plant, or take a bud from such tree and graft it on the trunk of the seedling. The twig, shoot or branch thus grafted is known as a scion. This scion may be (say) from six to nine inches long and a third of an inch or less in diameter. In the case of certain fruit trees, particularly apple trees, the grafting of the scion, cut from any given variety of tree, on a root of the same variety of tree, is rarely followed, for the reason that such roots are usually unobtainable. It is therefore customary to graft the scions on cheap roots of special trees, such as the French crab, which give the plant a strong start and a comparatively quick growth.

It has been observed, however, that modern apple orchards, composed usually entirely of trees grown from scions grafted on French crab roots, have a much higher mortality than much older orchards grown from plants provided with their own root system. It has been found that the cause of the premature decay of these trees (excluding cases of scale, harmful insects and other living organisms that attack the branches and leaves) has been root decay. In short, root decay is very common with apple trees grown from scions grafted on roots of different stock, while in orchards grown from plants having their own root system, root decay is comparatively rare.

I have discovered that it is possible to secure the pronounced advantages that arise from growing the plant from a scion that is grafted on a special root, and yet not sacrifice the advantages arising from growing trees from plants with their own root system.

The problem is solved in a very simple manner and at an expense which is practically nominal. It comprises grafting the scion on the root as heretofore but providing for the constriction of the scion just above the graft zone, and planting the grafted scion so that the constricted part thereof is substantially embedded in the earth, say about three to four inches below ground level. The constriction must be a permanent one, that is, one which will resist decay for the substantial length of time required to enable it to perform its function. I prefer to effect the restriction by winding a copper wire or band about the scion and securing the ends together so that they cannot be spread apart in the normal growth of the plant. It should be stated that it is by no means necessary or desirable that the encircling wire or band shall effect any actual constriction at the time of planting. It is only essential that it shall act to constrict during a comparatively early stage in the growth of the plant.

It is necessary that at the time of planting the buried part of the scion shall be provided with buds, because the presence of buds on the buried part of the scion is essential to the operativeness of my process.

As is well known, the root of a tree supplies moisture to the trunk and branches through the woody core of the tree. On the other hand, the food manufactured by the leaves is supplied to the root through the part of the trunk adjacent the outer bark.

During the initial growth of the plant, constricted as above described, the growth proceeds precisely as in the case of any grafted scion, the supply of moisture from the root and the supply of food to the root proceeding in the normal way. However, as the plant grows and the diameter of the trunk increases, the restrictive effect of the encircling band operates to choke the narrow annular channel through which the root receives the food supply manufactured by the leaves. This, of course, has a damaging effect on the root; but simultaneously with, and by reason of, the cutting down of the food supply to the root, the tissue immediately surrounding the buds submerged below the ground level and above the constriction begin to put out roots. While these are rapidly growing and flourishing, the original root remains practically undeveloped; and when the plant has reached the stage of growth adapting it for orchard planting, it is now receiving its soil moisture from the new roots which have sprung from the original scion. The nurse root can now be cut entirely free. By this time, the plant has a hardy, flourishing root system of its own.

The drawing is an elevation, somewhat pictorial, illustrating a grafted scion just after its original setting out. *a* is the scion and *b* the root, the two being grafted at *c* in the usual way. The line *e* represents the surface of the ground. The buds on the scion are lettered *d*. *f* is the band of copper or other material encircling the scion just above the graft and adapted, in the growth of the plant, to constrict the same just above the root *b* and choke or shut off the supply thereto of leaf-manufactured food.

I find it of pronounced advantage, in many instances, to select, for a scion, a branch, shoot or twig that has been the product of a single season's growth, and to sever it from the tree just at the point where the growth started; that is, at the junction between the older part of the branch representing a two years' growth and the younger part of the branch representing a one year's growth, and then graft the cutting to the root so that the base of the scion represents partly a year's growth and partly a two years' growth. Any skilled horticulturist will have no difficulty in locating the junction specified.

Having now fully described my invention, what I claim and desire to protect by Letters Patent is:

The improvement in the art of tree propagation which comprises grafting a scion having buds thereon on a root, encircling the scion just above the graft with a member adapted, in the normal expansion of a diameter of the scion during growth, to substantially constrict the same, and planting the grafted scion at such depth that the zone of constriction is substantially below the ground level with buds between the constriction and the ground level, whereby, in the course of plant growth, the food supply to the grafted root will be cut down, while submerged tissue in the vicinity of the buds below the ground level will put out its own roots, thus producing a grafted tree having its own root system.

In testimony of which invention, I have hereunto set my hand, at Philadelphia, Penna., on this 28th day of April, 1924.

ERNEST L. NIXON.